United States Patent [19]
Jackovitz et al.

[11] 3,928,068
[45] Dec. 23, 1975

[54] ACTIVE ELECTRODE COMPOSITION AND ELECTRODE

[75] Inventors: John F. Jackovitz, Monroeville; Earl A. Pantier, Verona; Christopher K. Wu, Turtle Creek, all of Pa.

[73] Assignee: Westinghouse Electric Corporation, Pittsburgh, Pa.

[22] Filed: May 20, 1974

[21] Appl. No.: 471,731

[52] U.S. Cl. .................. 136/24; 136/28; 136/29; 136/76
[51] Int. Cl.² ........................................ H01M 43/04
[58] Field of Search ............ 136/29, 28, 24, 20, 76, 136/75, 34, 67; 252/472

[56] References Cited
UNITED STATES PATENTS

| | | | |
|---|---|---|---|
| 3,066,178 | 11/1962 | Winkler | 136/24 |
| 3,076,860 | 2/1963 | Dickfeldt et al. | 136/24 |
| 3,436,267 | 4/1969 | Faber | 136/29 |
| 3,600,227 | 8/1971 | Hardman | 136/76 |
| 3,702,019 | 11/1972 | Pollack | 29/2 |
| 3,827,911 | 8/1974 | Pickett | 136/24 |

*Primary Examiner*—Anthony Skapars
*Attorney, Agent, or Firm*—R. D. Fuerle

[57] ABSTRACT

A composition is prepared which includes (1) basic nickel carbonate and (2) $CoCO_3$, $Co(OH)_2$, hydrates thereof, or mixtures thereof, where the number of cobalt atoms is about 2 to about 10% of the number of nickel atoms. The composition is slurried with water and an oxidant such as hypochlorite ion is added. The oxidant oxidizes the divalent nickel and cobalt ions to hydrates of $NiO_2$ and $CoO_2$, respectively. The solids are collected, washed, dried, and ground to a powder. The powder is mixed with water to form a paste which is applied to a porous conducting plaque to form an electrode.

16 Claims, 3 Drawing Figures

ACTIVE ELECTRODE COMPOSITION AND ELECTRODE

BACKGROUND OF THE INVENTION

In present iron-nickel batteries the nickel electrode is formed by electrochemically precipitating a mixture of (all percentages herein are by weight) Ni-95 percent (OH)$_2$ hydrate -5% Co(OH)$_2$ hydrate into the pores of a nickel or nickel-plated fiber plaque from a solution of hydrated NiNO$_3$ and CoNO$_3$ (see U.S. Pat. No. 3,600,227). Since the precipitated mixture does not entirely fill the plaque, repeated precipitations are necessary. A waiting period is required between each precipitation to permit fresh electrolyte to flow into the plaque. Typically, 6 pulses of 20 minutes each are used with a 5 to 10 minute rest period between pulses. This means that the total process of filling the plaque requires about 2½ to 3 hours. An additional 29 hours is then required to "condition" the electrode by charging and discharging it.

DESCRIPTION OF THE PRIOR ART

U.S. Pat. No. 3,436,267 discloses a process for making an electrode composition in which green nickel-II hydroxide is oxidized in an aqueous alkaline medium to black nickel-III hydroxide by means of chlorine gas or bromine water. It is stated that HOCl appears to be the actual oxidant. The use of basic nickel carbonate and admixture with cobalt is not disclosed.

SUMMARY OF THE INVENTION

We have found that an active electrode paste can be prepared by preparing an aqueous slurry of (1) basic nickel carbonate and (2) CoCO$_3$, Co(OH)$_2$, hydrates thereof, or mixtures thereof, and oxidizing the nickel and cobalt to the quadrivalent state with an oxidant. The solids are then collected, separated from contaminates, dried, ground to powder, mixed with water and applied to the plaque.

Not only is a great deal of production time saved, but the resulting electrode has a higher output. This means either that a battery of the same size will have a greater output or that batteries of the same output can be made smaller.

DESCRIPTION OF THE INVENTION

Figure 1:
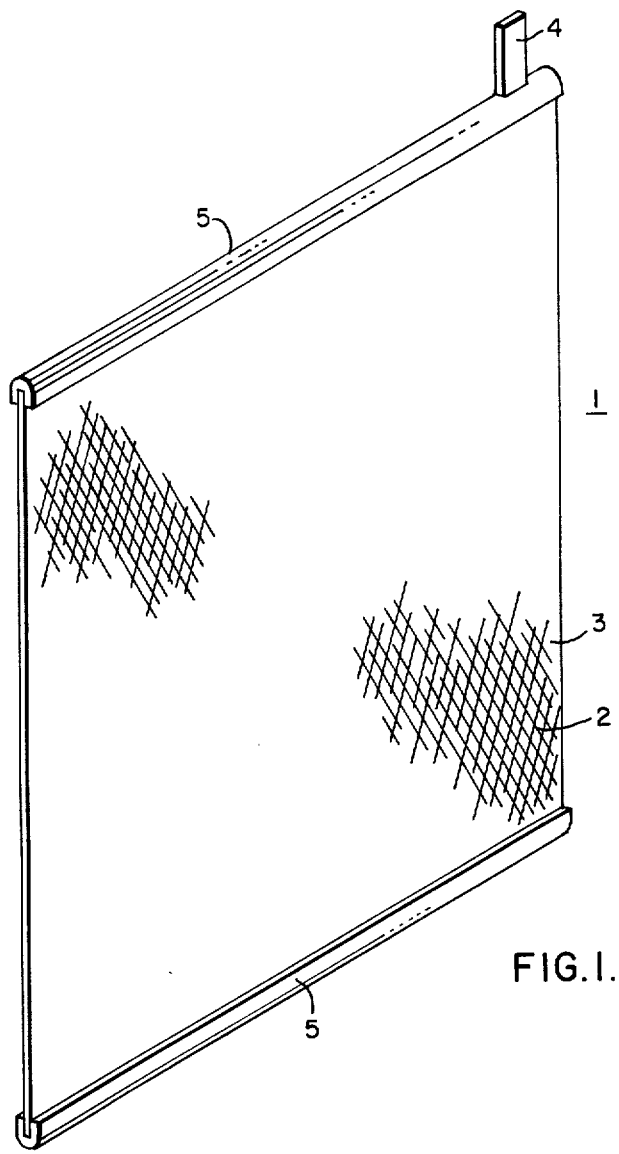
FIG. 1 is an isometric view partially cut away of a certain presently preferred electrode according to this invention.

In FIG. 1 a porous metal plaque 1 of sintered nickel or nickel-coated fiber 2 contains a paste 3 of active electrode material. A buss bar 4 supports the electrode and gathers the current. Clamps 5 support the plaque.

A composition is first prepared of (1) basic nickel carbonate, (2) CoCO$_3$, Co(OH)$_2$, hydrates thereof, or mixtures thereof, (3) at least sufficient water to form a slurry, and (4) a suitable oxidant in an amount sufficient to oxidize about 30 to about 75 percent of the nickel and cobalt atoms to a quadrivalent state.

The nickel is present as basic nickel carbonate, which is a readily available, inexpensive commercial source of nickel which works well in this invention. Its composition has been variously given as NiCO$_3$·2Ni(OH)$_2$·4H$_2$O and 2NiCO$_3$·3Ni(OH)$_2$·4H$_2$O. For the purpose of this invention, however, it will be defined to mean a hydrated mixture of nickelous carbonate and nickelous hydroxide in a molar ratio of about 0.5 to about 1.5.

The cobalt is also preferably present as basic cobalt carbonate, which may be considered to have the formula 2CoCO$_3$·Co(OH)$_2$·H$_2$O. However, other forms of cobalt such as Co(OH)$_2$ or CoCO$_3$ may also be used.

The water is present to serve as a reaction medium. A slurry of about 20 to about 60 percent solids is adequate. It should be noted that liquids such as alcohols and aromatics are unsuitable as reaction media since they are oxidized by the oxidant.

Suitable oxidants include hypochlorite ion, hypobromite ion, hypoiodite ion, oxygen, and persulfates such as sodium or potassium persulfate. Hypoiodite ion, however, is expensive and weak and oxygen is very weak and therefore requires a long time to oxidize the nickel and cobalt. Hypobromite ion is easy to use since it can be prepared from bromine and an alkali metal hydroxide. Hypochlorite ion, however, is preferred as it is inexpensive and convenient to use. Hypochlorite ion can be formed by adding chlorine gas and an alkali metal hydroxide such as NaOH or KOH to the slurry in stoichiometric proportions according to the equation:
$$2OH^- + Cl_2 \rightleftarrows ClO^- + Cl^- + H_2O.$$

The hypochlorite ion is believed to oxidize the nickel and cobalt as follows, where R stands for nickel or cobalt:

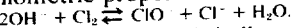
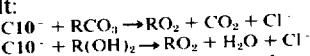

Oxidants such as peroxides and ozone have been found to be unsuitable since they decompose rather than oxidize the nickel and cobalt.

The amount of oxidant used should be sufficient to oxidize about 30 to about 75 percent of the nickel and cobalt atoms to the quadrivalent state since, if less than 30 percent are oxidized it is difficult to apply adequate amounts of paste due to its low density, and if more than 75 percent are oxidized electrochemical performance decreases. The optimum range of oxidation, which gives the maximum output, is about 65 to about 75 percent oxidized.

There is at present a controversy as to the existence of the trivalent and quadrivalent states of nickel and cobalt. While we do not wish to be bound by either theory, we have for clarity in describing this invention assumed that only the quadrivalent state exists. If it is subsequently established that the trivalent state exists and the quadrivalent does not exist, the invention could still be practiced in the same manner by assuming that the quadrivalent state did in fact exist.

The solids which settle are a mixture of the original basic nickel carbonate and CoCO$_3$, Co(OH)$_2$, hydrates, or mixtures plus the NiO$_2$ and CoO$_2$ formed by the oxidation. These solids are collected for example, by filtering or decanting, and are separated from any impurities which may be present. If hypochlorite was used, for example, chloride ions may be present. The solids are therefore washed with water until a test for chloride is negative.

The solids are then preferably dried and ground to a fine powder. Generally, a particle size of −325 mesh is satisfactory. The powder is mixed with sufficient water to form a paste, e.g. about 50 to about 70 percent solids. Again, the use of alcohols and aromatics instead of water does not work well as the quadrivalent nickel and cobalt will oxidize them. While the above procedure is preferred, the solids can be ground and used as a paste without the intermediate drying step.

The paste is then applied to the interstices of a porous conducting electrode. Application can be accomplished by rolling or pressing the paste into the plaque. The plaque is dried and pressed or pressed while moist to compact the powder.

The plaque is preferably comprised of sintered nickel or nickel-coated metal fibers such as that described in U.S. Pat. Nos. 3,702,019 and 3,710,430. Other porous conducting plaques can also be used.

The following examples further illustrate this invention.

EXAMPLE I

A slurry was prepared of 1364 g. $NiCO_3 \cdot 2Ni(OH)_2 \cdot 4H_2O$ and 180 g. $Co(NO_3)_2 \cdot 6H_2O$ in 3 liters of water. After the cobalt salt was dissolved 2.2 liters of a 45% aqueous solution of potassium hydroxide was added and the mixture was stirred until the precipitation of cobalt hydroxide was complete. Then 1035 g. of chlorine was slowly bubbled through the slurry. The chlorine immediately reacted with the excess potassium hydroxide and was converted to hypochlorite ion. The hypochlorite ion quickly oxidized the nickel and cobalt to the quadrivalent state, producing a dense black powder which settled rapidly when stirring was stopped. The black powder was removed and washed with deionized water until a test for chloride was negative. Iodine-thiosulfate titration of the powder indicated that it was 69 percent oxidized to nickel IV and cobalt IV.

EXAMPLE II

Example 1 was repeated except that the powder was oxidized 18, 30, and 80 percent. The powders, including the powder of Example I, were each dried and ground to a particle size of −325 mesh. Pastes of 60 percent solids in water were prepared from the powders.

The pastes were applied to 11 inch square sintered nickel fiber plaques by passing pasted plaques between rollers. The electrodes were then dried at room temperature. The finished electrodes were 0.070 inches thick and contained 2.17, 2.31, 2.78, and 2.70 grams of the nickel-cobalt powder for the 18, 30, 69, and 80 percent oxidized powders respectively.

The electrodes were placed in a 30% KOH electrolyte and charged at 250 or 500 ma/inch$^2$ (there does not appear to be any difference between the two charge rates) for 2½ hours (1¼ hours if 500 ma/inch$^2$ was used). They were then discharged at 125 ma/inch$^2$ until no more voltage was observed.

Figure 2:
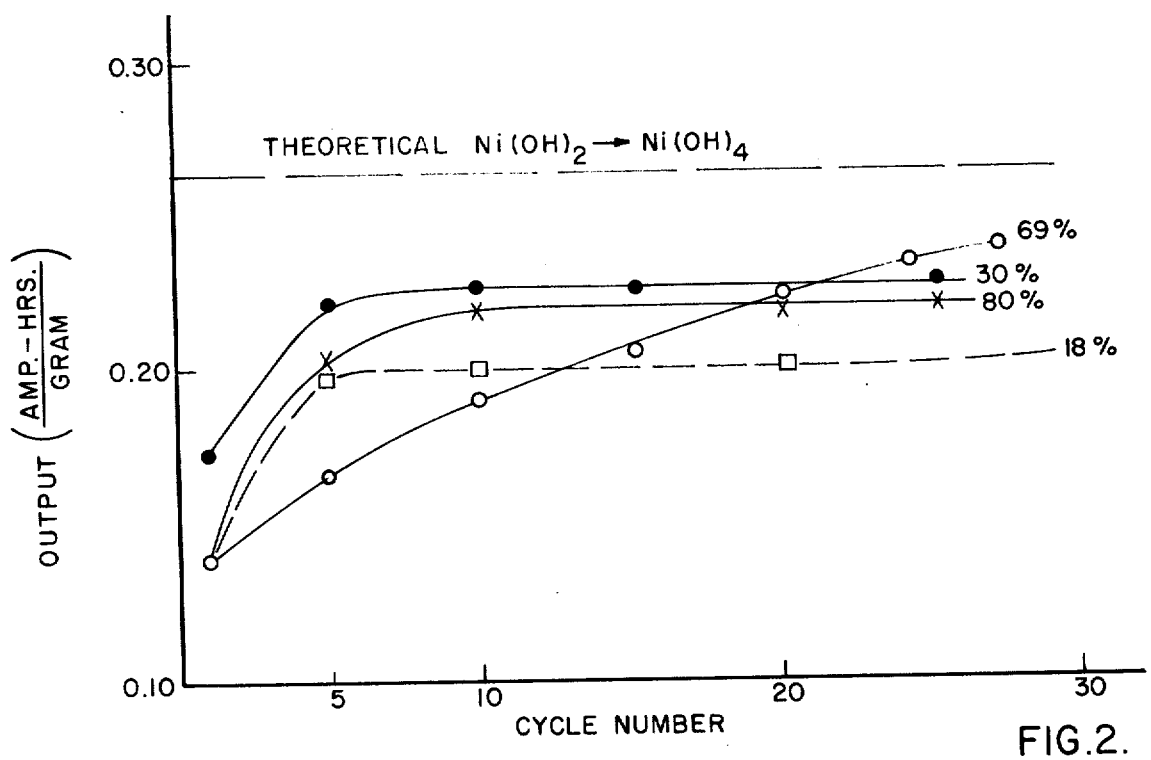
FIGS. 2 and 3 are diagrams of the results of experiments discussed in the examples.

The charge-discharge cycling was repeated for 30 cycles. FIG. 2 gives the results. FIG. 2 shows that the powders which were oxidized 30 and 69 percent gave a greater output than the powders oxidized 18 or 80 percent. It is not known why the 69 percent oxidized powder required a longer time to reach maximum output. The results were fully reproducible in additional similar tests.

EXAMPLE III

Figure 3:
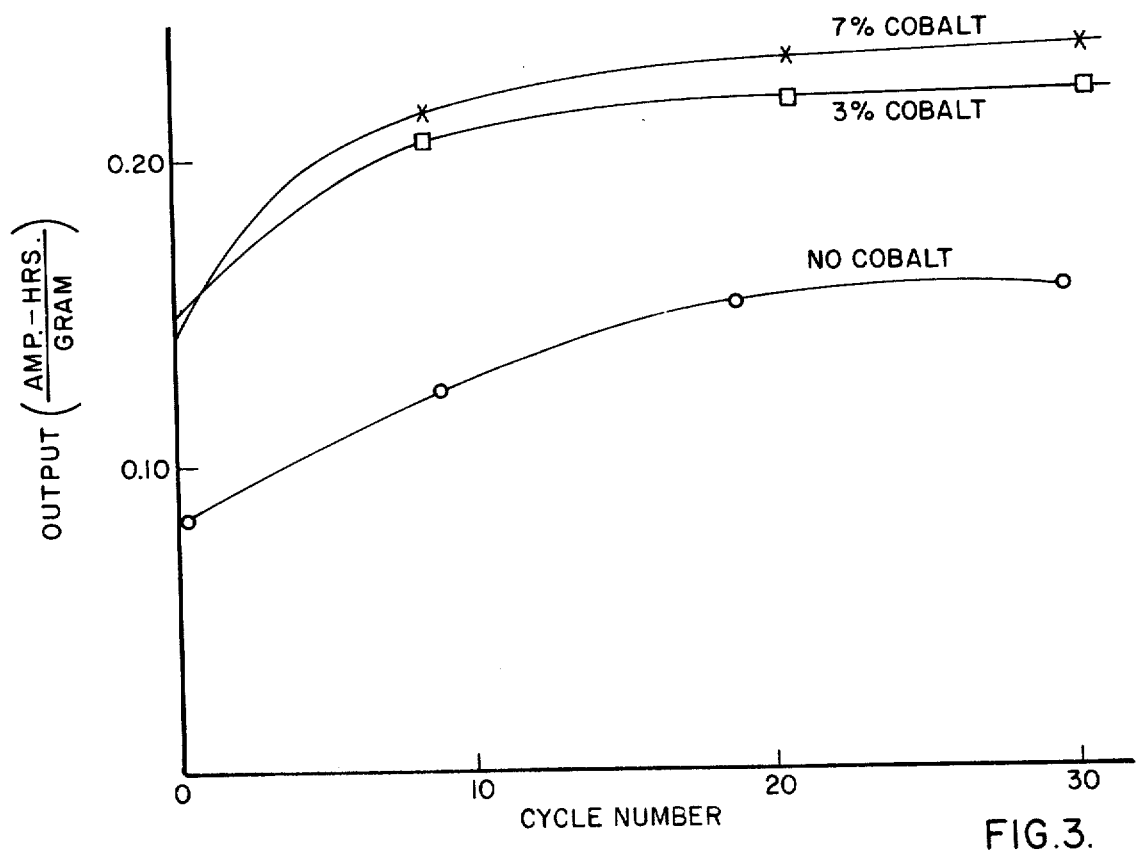

Examples I and II were repeated using no cobalt, 3% cobalt, and 7% cobalt oxidizing at 50 percent. FIG. 3 gives the results of testing the electrodes. FIG. 3 shows that the compositions using 3 and 7% cobalt gave substantially greater outputs than the compositions using no cobalt.

We claim:

1. A composition comprising:
   A. a hydrated mixture of nickelous carbonate and nickelous hydroxide in a molar ratio of about 0.5 to about 1.5; and
   B. a compound selected from the group consisting of $CoCO_3$, $Co(OH)_2$, hydrates thereof, and mixtures thereof, wherein the number of cobalt atoms in said composition is about 2 to about 10 percent of the number of nickel atoms.

2. A composition according to claim 1 wherein the number of cobalt atoms in said composition is about 3 to about 7 percent of the number of nickel atoms.

3. A composition comprising:
   A. about 25 to about 70 percent of a compound selected from the group consisting of
      1. a hydrated mixture of nickelous carbonate and nickelous hydroxide in a molar ratio of about 0.5 to about 1.5; and
      2. a compound selected from the group consisting of $CoCO_3$, $(OH)_2$, hydrates thereof, and mixtures thereof; and
   B. about 30 to about 75 percent of a compound selected from the group consisting of
      1. hydrates of $NiO_2$ and $CoO_2$ where the number of cobalt atoms in the composition, is about 2 to about 10 percent of the number of nickel atoms.

4. A composition according to claim 3 wherein the number of cobalt atoms in the composition is about 3 to about 7 percent of the number of nickel atoms.

5. A composition according to claim 3 including sufficient water to form a paste.

6. A composition according to claim 3 wherein said composition comprises:
   A. about 25 to about 35 percent of a compound selected from the group consisting of
      1. a hydrated mixture of nickelous carbonate and nickelous hydroxide in a molar ratio of about 0.5 to about 1.5; and
      2. a compound selected from the group consisting of $CoCO_3$, $Co(OH)_2$, hydrates thereof and mixtures thereof; and
   B. about 65 to about 75 percent of a compound selected from the group consisting of
      1. hydrates of $NiO_2$ and $CoO_2$ where the number of cobalt atoms in the composition is about 2 to about 10 percent of the number of nickel atoms.

7. An electrode comprising a conductive porous plaque containing a composition according to claim 3.

8. An electrode according to claim 7 wherein said conductive porous plaque comprises sintered fibers selected from the group consisting of nickel and nickel-coated metal.

9. A method making an active electrode material comprising:
   A. preparing a composition which comprises:
      1. a hydrated mixture of nickelous carbonate and nickelous hydroxide in a molar ratio of about 0.5 to about 1.5;
      2. a compound selected from the group consisting of $CoO_3$, $Co(OH)_2$, hydrates thereof, and mixtures thereof, where the number of cobalt atoms in the composition is about 2 to about 10 percent of the number of nickel atoms;
      3. sufficient water to form a slurry; and
      4. a suitable oxidant in an amount sufficient to oxidize about 30 to about 75 percent of the nickel and cobalt atoms to a quadrivalent state;

B. permitting said oxidant to oxidize about 30 to about 75 percent of the nickel and cobalt atoms to a quadrivalent state; and C. separating the solids from said water.

10. A method according to claim 9 wherein said oxidant is the hypochlorite ion.

11. A method according to claim 9 wherein the amount of said oxidant is sufficient to oxidize about 65 to about 75 percent of the divalent metal ions present to a quadrivalent state and about 65 to about 75 percent of said ions are so oxidized.

12. A method according to claim 9 including the additional final steps of

A. drying said solids;

B. grinding said dried solids to a fine powder;

C. mixing said powder with sufficient water to form a paste; and

D. applying said paste to the interstices of a porous conducting plaque.

13. A method according to claim 9 wherein said powder is ground to −325 mesh.

14. A method according to claim 9 wherein said cobalt is present in said composition as basic cobalt carbonate.

15. A method according to claim 9 wherein the number of cobalt atoms in said composition is about 3 to about 7 percent of the number of nickel atoms.

16. A method according to claim 9 wherein after said solids are separated they are washed to remove contaminates.

* * * * *